Patented Dec. 11, 1934

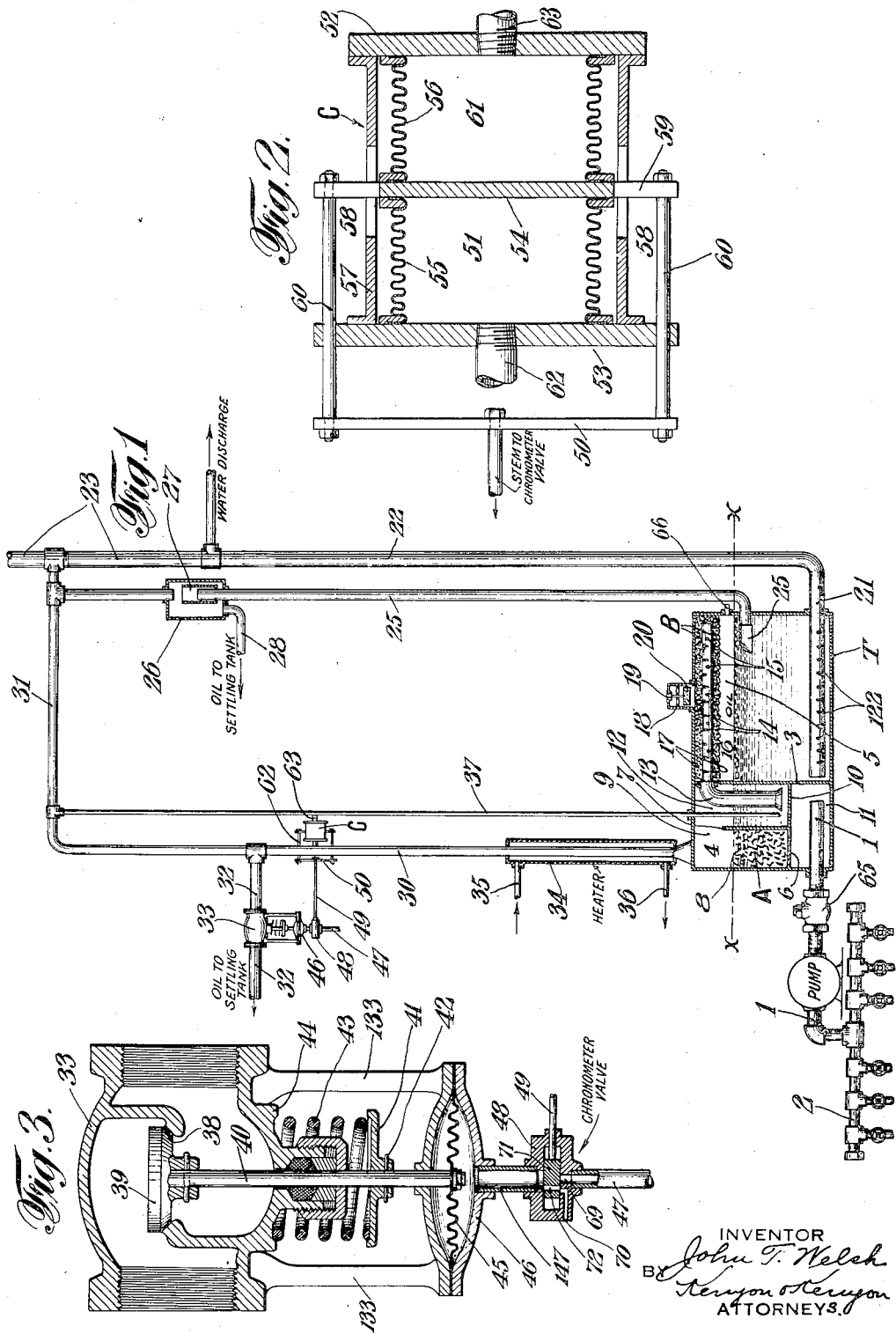

1,984,003

UNITED STATES PATENT OFFICE 1,984,003

PURIFICATION OF LIQUID

John T. Welsh, Ridgway, Pa.

Application November 21, 1929, Serial No. 408,695

16 Claims. (Cl. 210—47)

This invention relates to a method and apparatus for purifying liquids containing oil or oily matter or oil emulsions or containing any two or more such impurities and sometimes containing solid matter, and to the recovery of impurities removed from the water.

It is an important object of this invention to provide a method and apparatus whereby large quantities of water contaminated by oil or oily material may be purified by the removal of such oil or oily material, rapidly and to a very high degree of purification. An illustrative specific example of a mixture of liquids that may be purified in accordance with this invention, the impurities being recovered, is the oil-contaminated water occurring in the operation of ships, such as the ballast water carried in fuel tanks, bilge water, and other mixtures of oil or oily matter with water.

In accordance with this invention oil-contaminated water is passed through a continuous body of oil and particles of oil or emulsion in the water are caused to contact with the continuous body of oil by the action of a body of solid material floating upon the body of oil and consisting of material of such character and existing in particles of such size that the solid material will not pack and form channels but will, due to the movement and rearrangement of the particles, cause a dividing of the stream of oil containing water and cause each particle of oil carried by the water to come in contact with and be retained in the continuous body of oil. Preferably in accordance with this invention the oil contaminated water is subjected to a preliminary treatment for the separation of oil particles therefrom by gravity, such treatment also including the passing of the mixture through a body of broken crockery or other material of extensive surface acting to divide the stream of oil-containing water and to agglomerate fine particles of oil or emulsion into particles of such size that their buoyancy will cause them to rise in the water. Also, provision is preferably made for the removal of solids such as sand or dirt and particularly solids that may carry oil or oily material with them.

Other and further objects and advantages of this invention will appear from the following description of apparatus embodying my invention and useful in the practice of my method and which is set forth mainly as an illustrative embodiment of my invention with the intention that my invention is not limited to the details thereof.

In the drawing in which like reference characters indicate similar parts,

Fig. 1 is a vertical elevation, partly in section, and showing diagrammatically apparatus embodying my invention and whereby my process may be practiced;

Fig. 2 is a detail view, in vertical section, of a valve mechanism embodied in the construction shown in Fig. 1;

Fig. 3 is a detail view of valve-controlling mechanism embodied in the construction shown in Fig. 1.

Referring to the drawing pipe 1 leads from a pump P of which the suction side is connected to a manifold 2 having branch pipes leading to various points at which oil contaminated water collects. In a ship such pipes would lead to bilges, fuel storage tanks and all other places at which oil-contaminated water may occur.

A separating tank T constituting one embodiment of important features of this invention, is circular in vertical transverse-section and is divided by partition 3 into a preliminary separating compartment 4 and a final separating compartment 5. Partition 7 extends vertically and transversely in compartment 4, having its upper edge spaced from the top of compartment 4 to provide a liquid passage 9 over the top of partition 7 and having its lower edge spaced from the bottom of tank T. Partition 7 divides compartment 4 into a liquid-upflow passage 8 and a liquid downflow passage 12. Transverse partition 10 closes the lower end of liquid passage 12 and a perforated partition 6, or other suitable means, supports in liquid passage 8 a body A of broken crockery or other similar material having extensive surface, and acting to divide stream of oil-containing water passing therethrough and to take up particles of oil therefrom and thereby form bodies of oil that are large enough to rise in the liquid in compartment 4. The partitions 6 and 10 cooperate with partition 3 to divide off from the bottom of compartment 4 a sediment chamber 11 into which leads the supply pipe 1.

From a lower point of compartment 12 a distributing pipe 13 leads through the upper part of partition 3 and extends along the upper part of compartment 5 and is provided with plurality openings such as the slots 14 extending transversely in the upper wall thereof and holes 15 through the sides thereof, the end of pipe 13 preferably being closed.

Compartment 5 is preferably filled to the level $x$—$x$ with water on the surface of which floats a body of oil 16. On or in the body of oil floats a body of solid material B that is of such character and in particles of such size that it will not pack and form channels for the downward passage of oil-containing liquid flowing from openings 14 and 15 and will divide a stream of oil-containing water passing therethrough with the result that particles of oil in the water will be brought into intimate contact with the body of oil 16. The body of material 17 may consist of coarsely ground particles of cork. Compartment 5 is provided with a vent chamber 18 having a vent opening 19 controlled by a float 20.

From a lower level of compartment 5 leads water discharge pipe 21 which extends throughout substantially the entire length of the lower portion of compartment 5 and is provided with spaced openings such as the transverse slots 122 that are located in the lower wall of pipe 21, the inner end of pipe 21 preferably being closed. Water outlet pipe 21 leads into riser 22 that merges into vent 23. Water-discharge pipe 24 leads from riser 22 and may discharge water overboard or elsewhere.

Oil pipe 25 leads from an intermediate level of tank T upwardly into oil chamber 26 and is provided with an adjustable sleeve 27 for varying the upper level of the column of oil in pipe 25 in order to maintain liquid balance between that column of oil and the column of water in riser 22, the upper level of which is substantially at the discharge pipe 24. Overflow pipe 28 leads from the lower part of chamber 26 to any suitable point such as a settling tank.

From the top of compartment 4 of tank T leads a main oil riser 30 which extends to a vent-header 31 communicating with vent 23. Leading from the side of oil riser 30 is an oil discharge pipe 32, provided with a control valve 33 and leading to any desired point such as a settling tank. Oil riser 30 is preferably provided with a heater, such as the heating jacket 34 having a steam inlet 35 and a drain 36. Such a heater reduces the viscosity of the oil and emulsion and may cause some settling out of water while preparing the oil for any further treatment.

A water column 37 leads from a lower level of compartment 12, up to the vent-header 31.

Valve 33 comprises a valve seat 38 and a valve member 39 of any desirable construction. The valve member is biased to closed position by a spring, as by having a stem 40 on which a disk 41 is held in place by a pin 42 while spring 43 is compressed between disk 41 and seat 44 on the casing of valve 33. Stem 40 is connected to diaphragm 45 that extends across chamber 46 which has a steam inlet 147 and is fixed with respect to valve 33 as by arms 133. Steam is supplied by pipe 47 and the flow of steam into inlet 147 is controlled by valve 48. This valve may be termed "pilot" valve or a "chronometer" valve and it may have any suitable construction such as a steam inlet passage 69 and a vent 70 with which cooperate slide 71 that is operated by 49 and is provided with passage 72 which puts chamber 46 into communication with the atmosphere through vent 70 or with steam pipe 47 through passage 69 according to the position of slide 71 which is operated by stem 49 connected to yoke 50.

The oil-discharge controlling means C which operates the yoke 50 constitutes an important feature of my invention and consists of chambers 51 and 61 formed by fixed end walls 52 and 53 and an intermediate partition 54 and bellows-like side wall sections 55 and 56. The sections 55 and 56 are extensible and contractible and the end members 52 and 53 are held in fixed relation by a surrounding and stationary cylindrical wall 57 provided with slots 58 through which extend ears or lugs 59 attached to partition 54. Operating rods 60 are attached to the lugs 59 and to yoke 50 and are guided in one of the end members 52 or 53. One of the compartments of the valve-actuating means is connected to the oil riser and the other compartment thereof is connected to the water column at substantially the same level. Thus compartment 51 is connected to oil riser 30 by pipe 62 and compartment 61 is connected to water column 37 at substantially the same level by pipe 63. A column of oil or oil and water in riser 30 will balance and extend to a higher level than the water in column 37 and at an intermediate level there will be a differential in pressure between the oil in riser 30 and the water in column 37 particularly when the liquid in riser 30 is all oil. Such differential pressure will be transmitted to compartments 51 and 61 in controlling member C and will cause a movement of the partition 54 and a corresponding movement of valve slide 71. Thus when the contents of riser 30 consists entirely or largely of oil the liquid column in riser 30 will extend for a considerable distance above the liquid level of the water in column 37 in order to maintain balance, and the head of oil above controller C will be much greater than the head of water above controller C and the pressure in compartment 51 will exceed the pressure in compartment 61 and slide 71 of pilot valve 48 will be moved to a position in which passage 72 of slide 71 admits steam from pipe 47 into chamber 46. Then diaphragm 45 will rise and oil will discharge from riser 30 until change of relative pressures in compartments 51 and 61 moves yoke 50 and stem 49 and slide 71 to a position in which passage 72 forms a communication between chamber 46 and vent 70 leading to the atmosphere. Then valve 39 closes. Oil passing through pipe 32 will be passed to any desired point such as a tank in which settling may occur and from which oil and oily material may pass to further purifying apparatus such as a centrifugal or other purifier that may be useful in further preparing the oil for use or consumption.

In the operation of the described apparatus water contaminated with immiscible impurities is passed into tank T through pipe 1 and sand or heavy solids settle in compartment 11 in order to insure the removal of oily material that may be adhering thereto. The liquid passes through the openings in partition 6 and thence through the broken crockery or other material of extensive surface that will divide the stream of oil-containing water and take up particles of oil therefrom and form globules of oil that are separable by gravity. Oil and gas separating in compartment 4, when the flow is relatively quiescent, pass upward in oil riser 30 while water passes through passage 9 into compartment 12 and is distributed in compartment 5 by means of the openings 14 and 15 in pipe 13. The discharge of liquid through openings 14 and 15 agitates the surrounding body of solid material 17. The particles of solid material divide up the streams of water and their movements bring oily particles, such as oil globules containing water into contact with a body of light oil 16 which may be light fuel oil suitable for subsequent supply to the burners of boilers, or in some cases kerosene. The particles of oil contained in the liquid entering compartment 5 mix with and are retained in the body of light oil 16 and the water passes out through pipe 21. If there is extensive accumulation of oil in compartment 5 it will rise in pipe 25 until the column of oil therein balances the column of water in riser 22 and then overflows sleeve 27 into chamber 26. Oil and oily particles that separate from the mixture in compartment 4 will rise in the main oil riser 30 and be discharged therefrom under the control of the controlling member C as heretofore described.

Supply pipe 1 is provided with a non-return valve 65 of any suitable design to prevent draining of tank T upon cessation of supply of mixture. Compartment 5 of tank T is provided with inlet 66 for charging compartment 5 with light oil. All parts of the apparatus may be provided with clean-out and inspection opening provided with removable covers, as desired.

While I have described my invention in considerable detail it is understood that it is not limited to the details described but includes such variations and modifications as fall within the hereunto appended claims. In this connection it is to be noted that it will be obvious to those skilled in the art that the flow of mixture to and through the separating apparatus must not exceed a velocity at which separation to a desired degree is effected.

Also, any constructional details may be employed for the purpose of eliminating the possibility that oil will accumulate in water column 37, and if oil should find its way into that column and thereby increase the weight of liquid therein above controller C and impair the operation of the apparatus, such oil may be removed as by blowing it out with steam or air or in any other desired manner. Instead of using coarsely ground cork for the body of material 17, cocoa nut fiber, sponges or other materials may be employed which function similarly to bring the oil particles in the water into contact with the light oil, a pervious support being provided to maintain the material within the layer of light oil when the material employed is not supported in oil by its buoyancy.

I claim:

1. In the removal of oil or emulsions or oily matter from water, the steps comprising agglomerating oily particles in the water, withdrawing agglomerated oil from the water, and then passing the water through a continuously maintained body of lighter oil and thereby taking into said body of oil residual oily particles in the water.

2. In the removal of oil or emulsions or oily matter from water, the steps comprising dividing a body of the mixture into irregular streams and flowing such streams in contact with sizable oil-coated non-absorbing material, bringing said streams together in a zone of low-flow-velocity, withdrawing oily matter from an upper level of said zone, and immediately flowing the residue of the mixture through a continuously maintained body of oil.

3. In the removal of oil or emulsions or oily matter from water, the steps comprising passing the mixture through a mass of broken solids submerged in mixture, withdrawing oily material, and then immediately passing the residue through a non-filtering mass of non-absorbing solid particles submerged in oil.

4. In the removal of oil or emulsions or oily matter from water, the steps comprising passing the mixture through the voids of a mass of solids of such size as to form free passages therethrough and submerged in mixture, withdrawing oily material, and then passing the residue through a non-filtering mass of solids floating in oil.

5. In the removal of oil or emulsions or oily matter from water, the step comprising passing the mixture downwardly through a non-filtering mass of solids floating and submerged in oil.

6. In the removal of oil or emulsions or oily matter from water, the step comprising passing the mixture through a continuously maintained body of oil containing non-filtering solid particles free for movement.

7. In apparatus for the separation of oil or emulsions or oily matter from water, a compartment containing a body of relatively light oil in the upper portion thereof and having a mixture inlet at an upper level thereof, an oil discharge conduit leading upward from an intermediate level of said compartment, and a water conduit leading upward from a lower level of said compartment, said oil conduit being open for the discharge of liquid at a slightly higher level than is said water conduit.

8. In apparatus for the separation of oil or emulsions or oily matter from water, a chamber having a mixture inlet, an oil discharge conduit leading upward from an upper level of said chamber and provided with an oil outlet, a water column extending upward from said chamber, valve means operative to control flow of liquid from said oil outlet, and means responsive to differences of pressure at substantially the same level of said oil conduit and water column for operating said controlling means.

9. In apparatus for the separation of oil or emulsions or oily matter from water, a chamber having a mixture inlet, an oil discharge conduit leading upward from an upper level of said chamber and provided with an oil outlet, a water column extending upward from said chamber, means operative to control flow of liquid from said oil outlet, an expansible and contractible chamber having a partition dividing said last named chamber into compartments, a conduit leading from said oil conduit to one of said compartments, a conduit from said water column to the other of said compartments, and an operative connection between said partition and said controlling means.

10. In apparatus for the separation of oil or emulsions or oily matter from water, a chamber having a partition dividing said chamber into compartments and providing a passage between said compartments at an upper level of each compartment, the first of said compartments having a mixture inlet, a body of loosely packed solids in said first compartment between said inlet and said passage, the second of said compartments having an outlet from a lower level thereof and containing a body of lighter oil extending below said passage, and a body of movable solids in said body of oil.

11. In apparatus for the separation of oil or emulsions or oily matter from water, means for confining a body of liquid during flow thereof and having a mixture inlet, means adapted to be submerged by the mixture in said confining means for dividing into streams a body of mixture flowing through said confining means, means for maintaining a body of oil in the path of liquid flowing in said confining means, means submerged in said oil for dividing into streams liquid flowing through said oil, and means for withdrawing oil from the mixture between said dividing means.

12. In apparatus for the separation of oil or emulsions or oily matter from water, a first chamber and a second chamber, the first of said chambers having a mixture inlet at a lower level thereof and an oil outlet leading from an upper level thereof, a vertical partition dividing said first chamber into compartments connected at their upper ends, a body of loosely packed material of extensive surface supported in one of said compartments, a partition closing the bottom of the second of said compartments, a conduit leading from a lower level of said second compartment to an upper level of said second chamber, said second chamber containing a body of oil and having a water outlet from a lower level thereof, a mass of loosely packed solid particles supported by said oil, and an oil outlet from the upper level of said second compartment.

13. In apparatus for the separation of oil or oily matter or emulsions from water, a cylindrical chamber lying with its axis horizontal and having an upwardly extending water outlet leading from a lower level thereof and containing a body of oil, a mixture inlet pipe extending horizontally in an upper level of said chamber and having a plurality of spaced liquid passages, a mass of loosely packed solids supported by said oil and surrounding said inlet pipe and an oil outlet from an upper level of said chamber.

14. A process for separating oil from water comprising, passing the mixture through sizable oil coated particles, drawing off agglomerated oil, and immediately and intimately contacting the residue with a continuously maintained body of oil.

15. A process for separating oil from water comprising, passing the mixture through sizable irregular oil coated particles to agglomerate oil in the influent, and then immediately passing the mixture through a continuously maintaining body of lighter oil to complete the separation process.

16. A process for separating oil from water comprising, passing the mixture through coarse aggregate to diminish the speed of flow of the influent, drawing off agglomerated oil, and then immediately passing the residue through material floating on a continuously maintaining body of oil to effect intimate contact between said residue and said oil.

JOHN T. WELSH.